United States Patent
Merchant et al.

(10) Patent No.: US 6,775,290 B1
(45) Date of Patent: Aug. 10, 2004

(54) MULTIPORT NETWORK SWITCH SUPPORTING MULTIPLE VLANS PER PORT

(75) Inventors: Shashank Merchant, Sunnyvale, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,148

(22) Filed: May 24, 1999

(51) Int. Cl.[7] ............................................. H04L 12/56
(52) U.S. Cl. ........................ 370/395.53; 370/395.52; 370/395.31
(58) Field of Search ................................ 370/392, 393, 370/395, 396, 395.53, 395.52, 395.54, 395.31

(56) References Cited

U.S. PATENT DOCUMENTS

| | | | |
|---|---|---|---|
| 5,394,402 A | * 2/1995 | Ross | 370/402 |
| 5,515,376 A | 5/1996 | Murthy et al. | |
| 5,740,171 A | * 4/1998 | Mazzola et al. | 370/392 |
| 5,742,604 A | * 4/1998 | Edsall et al. | 370/401 |
| 5,764,636 A | * 6/1998 | Edsall | 370/256 |
| 5,949,783 A | * 9/1999 | Husak et al. | 370/396 |
| 5,959,989 A | * 9/1999 | Gleeson et al. | 370/390 |
| 5,968,126 A | * 10/1999 | Ekstrom et al. | 370/409 |

OTHER PUBLICATIONS

IEEE Standards Board, Dec. 8, 1998, IEEE Standards for Local and Metropolitan Area Networks: VLANs, IEEE, pp. 1,14,16.*

* cited by examiner

Primary Examiner—Wellington Chin
Assistant Examiner—William Schultz

(57) ABSTRACT

A novel method of enabling a port of a network switch to support connections with multiple VLANs. The method comprises storing VLAN data indicating a plurality of VLAN identifiers corresponding to the multiple VLANs supported by the port. A VLAN identifier of a data packet received via the port is compared with the plurality of VLAN identifiers determined using the stored VLAN data. The data packet is forwarded for further processing if the VLAN identifier matches one of the plurality of VLAN identifiers. However, the data packet is discarded if the VLAN identifier does not match one of the plurality of VLAN identifiers. Moreover, VLAN information corresponding to a VLAN identifier of a data packet to be transmitted from the port is compared with the stored VLAN data to determine whether the VLAN identifier matches one of the plurality of VLAN identifiers supported by the port. The data packet is prevented from being transmitted from the port if the VLAN identifier does not match one of the plurality of VLAN identifiers.

13 Claims, 8 Drawing Sheets

VLAN Index to VLAN ID Table

| | VLAN ID VLAN_DP[11:0] |
|---|---|
| VLAN Idx 0 | |
| VLAN Idx 1 | |
| VLAN Idx 2 | |
| VLAN Idx 3 | |
| ⋮ | ⋮ |
| VLAN Idx 63 | |

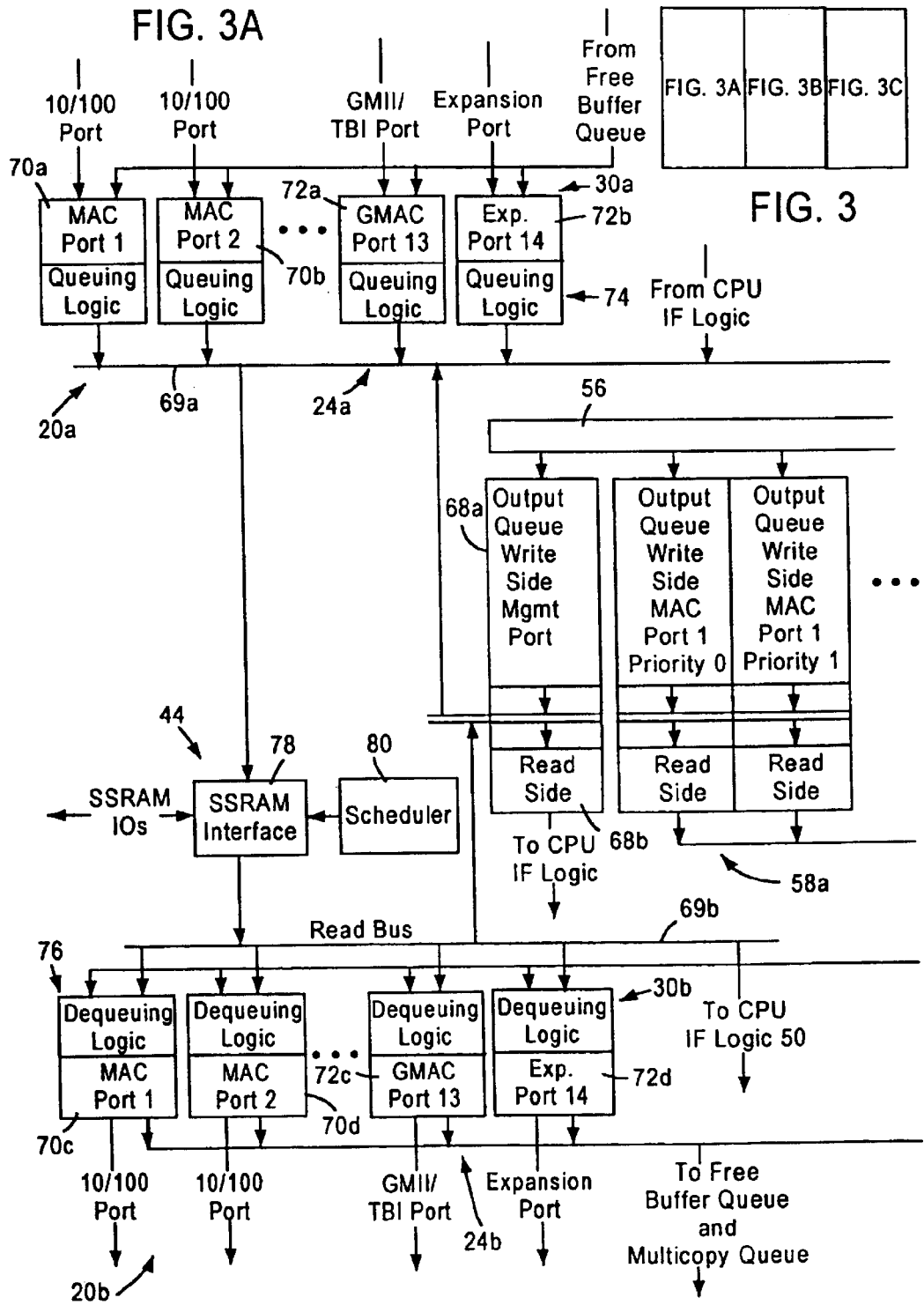

Port to VLAN Index Table

|  | VIX[5:0] |
|---|---|
| Port 0 |  |
| Port 1 |  |
| Port 2 |  |
| Port 3 |  |
| ⋮ |  |
| Port 14 |  |

FIG. 7

VLAN Member Set Table

|  | MSET[63:0] | | | |
|---|---|---|---|---|
|  | 3 | 2 | 1 | 0 |
| Port 0 |  |  |  |  |
| Port 1 |  |  |  |  |
| Port 2 |  |  |  |  |
| Port 3 |  |  |  |  |
| ⋮ |  |  |  |  |
| Port 14 |  |  |  |  |

FIG. 9

VLAN Index to VLAN ID Table

|  | VLAN ID VLAN_DP[11:0] |
|---|---|
| VLAN Idx 0 |  |
| VLAN Idx 1 |  |
| VLAN Idx 2 |  |
| VLAN Idx 3 |  |
| ⋮ | ⋮ |
| VLAN Idx 63 |  |

FIG. 8

# MULTIPORT NETWORK SWITCH SUPPORTING MULTIPLE VLANS PER PORT

FIELD OF THE INVENTION

This invention relates to data communication systems, and more particularly, to a system for enabling each port of a multiport network switch to support connections with members of multiple virtual local area networks (VLANs).

BACKGROUND ART

Virtual networking has become one of the major new areas in the internetworking industry. Virtual networking refers to the ability of switches to configure logical topologies on top of the physical network infrastructure, allowing any arbitrary collection of network segments to be combined into an autonomous user group, appearing as a single network.

A virtual LAN (VLAN) is a local area network that maps workstations on some other basis than geographic location. For example, VLANs may be created to combine workstations by department, type of user, or primary application. The VLAN controller can delete or add workstations, and manage loadbalancing and bandwidth allocation. Workstations in a VLAN behave as if they are connected to the same wire even though they may actually be physically located on different segments of a LAN. One of the biggest advantages of VLANs is that when a workstation is physically moved to another location, it can stay on the same VLAN without any hardware reconfiguration.

A multiport network switch may be provided in a data communication network to enable data communication between multiple network nodes connected to various ports of the switch. A logical connection may be created between receive ports and transmit ports of the switch to forward received frames to appropriate destinations.

Many VLAN implementations define VLAN membership by groups of switch ports. For example, ports 1, 2, 3, 7 and 8 on a switch make up VLAN A, while ports 4, 5 and 6 make up VLAN B. Alternatively, VLAN membership may be based on MAC addresses.

In conventional network switches, each port supports connections with members of a single VLAN. However, to increase the flexibility of network switching, it would be desirable to provide a network switch that enables each switch port to support connections with members of multiple VLANs.

DISCLOSURE OF THE INVENTION

The invention offers a novel method of enabling a port of a network switch to support connections with multiple VLANs. The method comprises storing VLAN data indicating a plurality of VLAN identifiers corresponding to the multiple VLANs supported by the port. The VLAN identifier of a data packet received via the port is compared with the plurality of VLAN identifiers determined using the stored VLAN data. The data packet is forwarded for further processing if the VLAN identifier matches one of the plurality of VLAN identifiers. However, the data packet is discarded if the VLAN identifier does not match one of the plurality of VLAN identifiers.

Moreover, VLAN information corresponding to the VLAN identifier of a data packet to be transmitted from the port may be compared with the stored VLAN data to determine whether the VLAN identifier matches one of the plurality of VLAN identifiers supported by the port. The data packet is prevented from being transmitted from the port if the VLAN identifier does not match one of the plurality of VLAN identifiers. The VLAN data may be provided for each of multiple ports of the switch.

In accordance with another aspect of the invention, a network switching system comprises a first port for receiving data packets from members of a first plurality of VLANs, a second port for transmitting the data packets, and a decision making engine responsive to the data packets received by the first port for controlling forwarding of the received data packets to the second port. The decision making engine includes a first logic circuit responsive to the received data packets to prevent the switching system from forwarding to the second port a received data packet that does not belong to the first plurality of VLANs.

The decision making engine may comprise a first storage for storing a VLAN member set table having a first VLAN member set indicating information on the first plurality of VLANs supported by the first port. The first VLAN member set may comprise VLAN indices pointing to VLAN identifiers corresponding to the first plurality of VLANs. A second storage may be provided for storing a VLAN index to VLAN identifier table indicating correlation between the VLAN indices and the VLAN identifiers.

The second port may be configured for transmitting the data packets to a second plurality of VLANs. The decision making engine may comprise a second logic circuit responsive to the received data packets to prevent the second port from transmitting a data packet that does not belong to the second plurality of VLANs. The VLAN member set table may have a second VLAN member set indicating information on the second plurality of VLANs supported by the second port.

In accordance with a further aspect of the invention, a data communication system for switching data between multiple ports comprises an input logic circuit responsive to received data packets for discarding incoming data packets that do not belong to VLANs supported by receiving ports, and an output logic circuit responsive to data packets passed through the input logic circuit for preventing the ports from transmitting data packets that do not belong to VLANs supported by transmitting ports. A VLAN membership system is coupled to the input and output logic circuits for enabling each of the multiple ports to support connections with multiple VLANs.

The VLAN membership system may comprise a VLAN member set storage for storing a VLAN member set table having multiple entries corresponding to each of the multiple ports. Each entry in the VLAN member set table contains VLAN indices identifying the multiple VLANs supported by the corresponding port. The VLAN membership system may further comprise a VLAN index storage for storing a VLAN index to VLAN identifier table indicating correlation between the VLAN indices and VLAN identifiers of the received data packets.

Various objects and features of the present invention will become more readily apparent to those skilled in the art from the following description of a specific embodiment thereof, especially when taken in conjunction with the accompanying drawings.

BRIEF DESCRIPTION OF THE DRAWINGS

FIG. 7 is a diagram illustrating a port to VLAN index table.

FIG. 8 is a diagram illustrating a VLAN index to VLAN ID table.

FIG. 9 is a diagram illustrating a VLAN member set table.

BEST MODE FOR CARRYING OUT THE INVENTION

Figure 1:
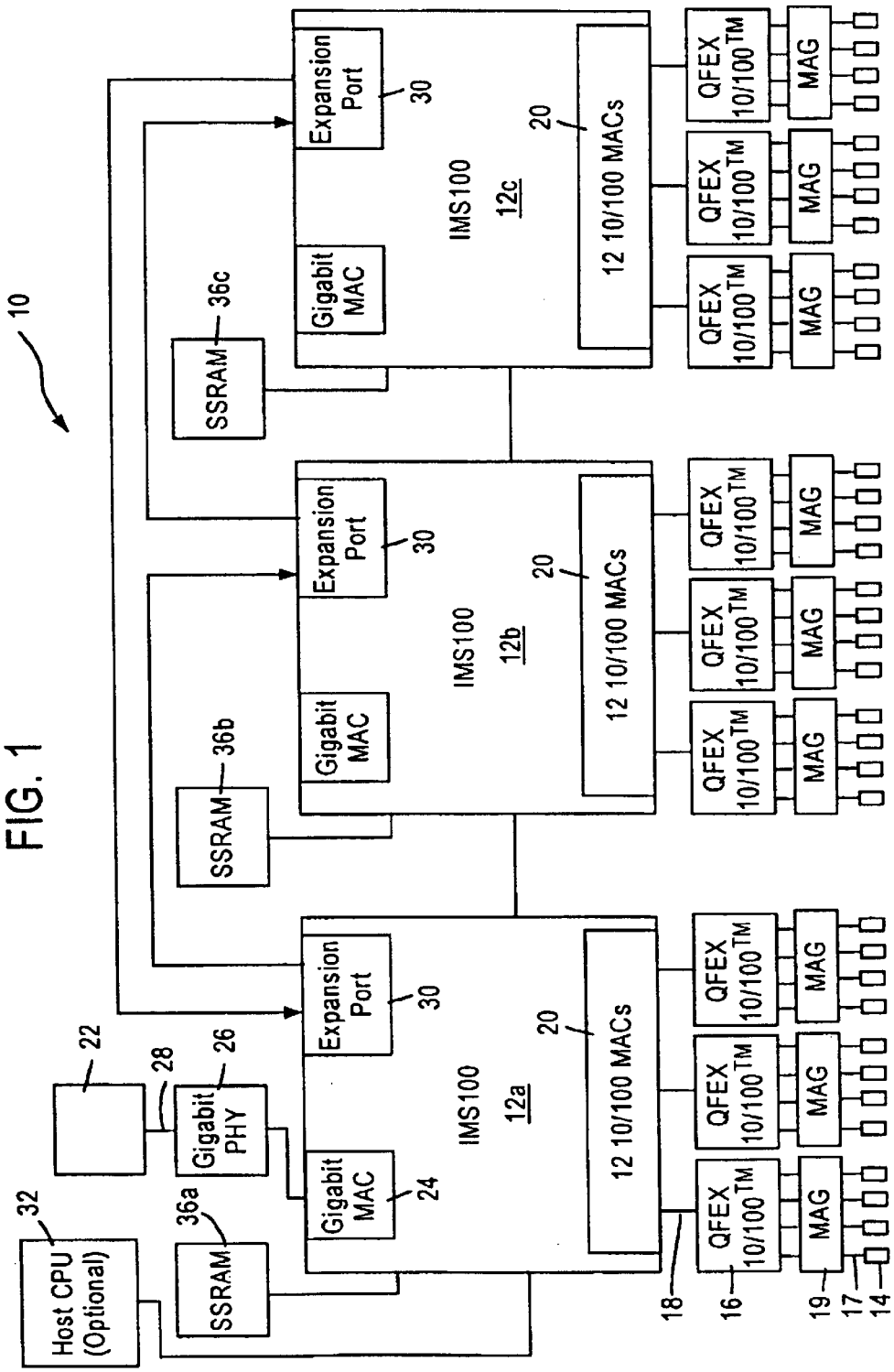
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
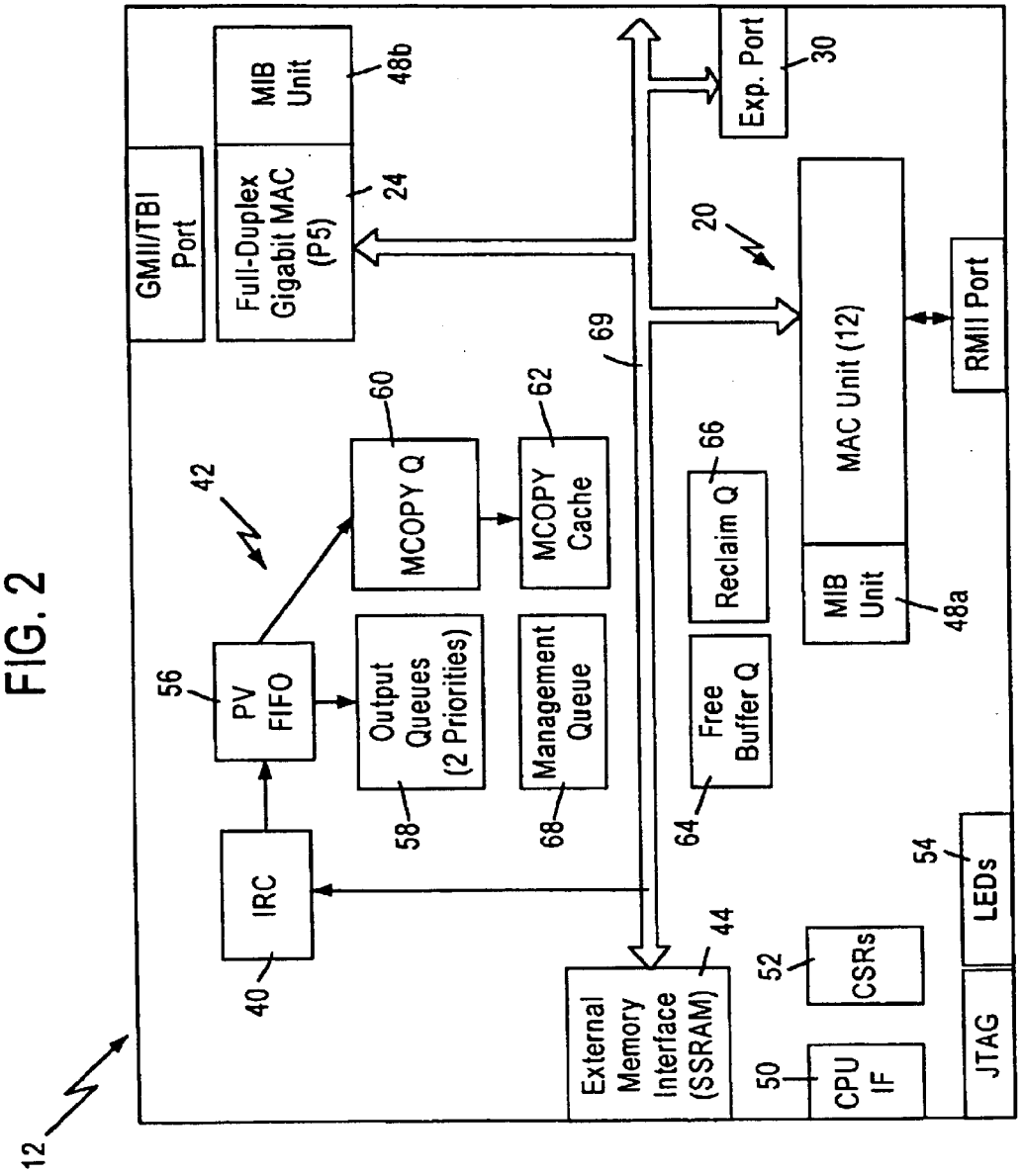
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a-frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
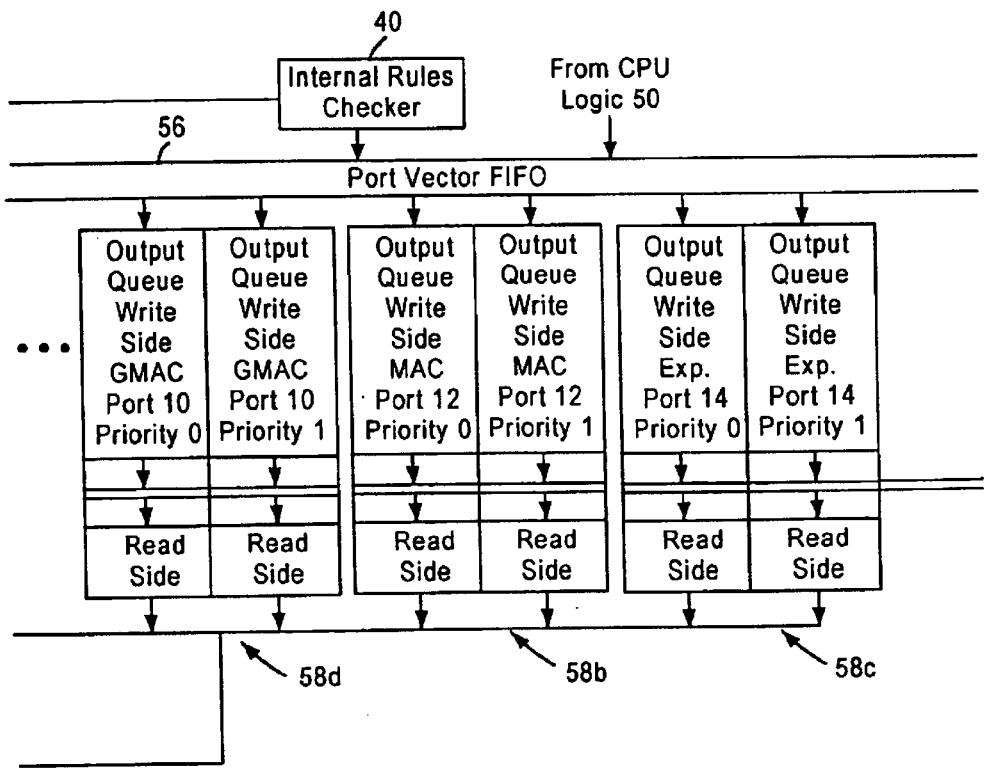
FIG. 3 is a block diagram illustrating in detail the switching subsystem of FIG. 2.
Figure 3C:
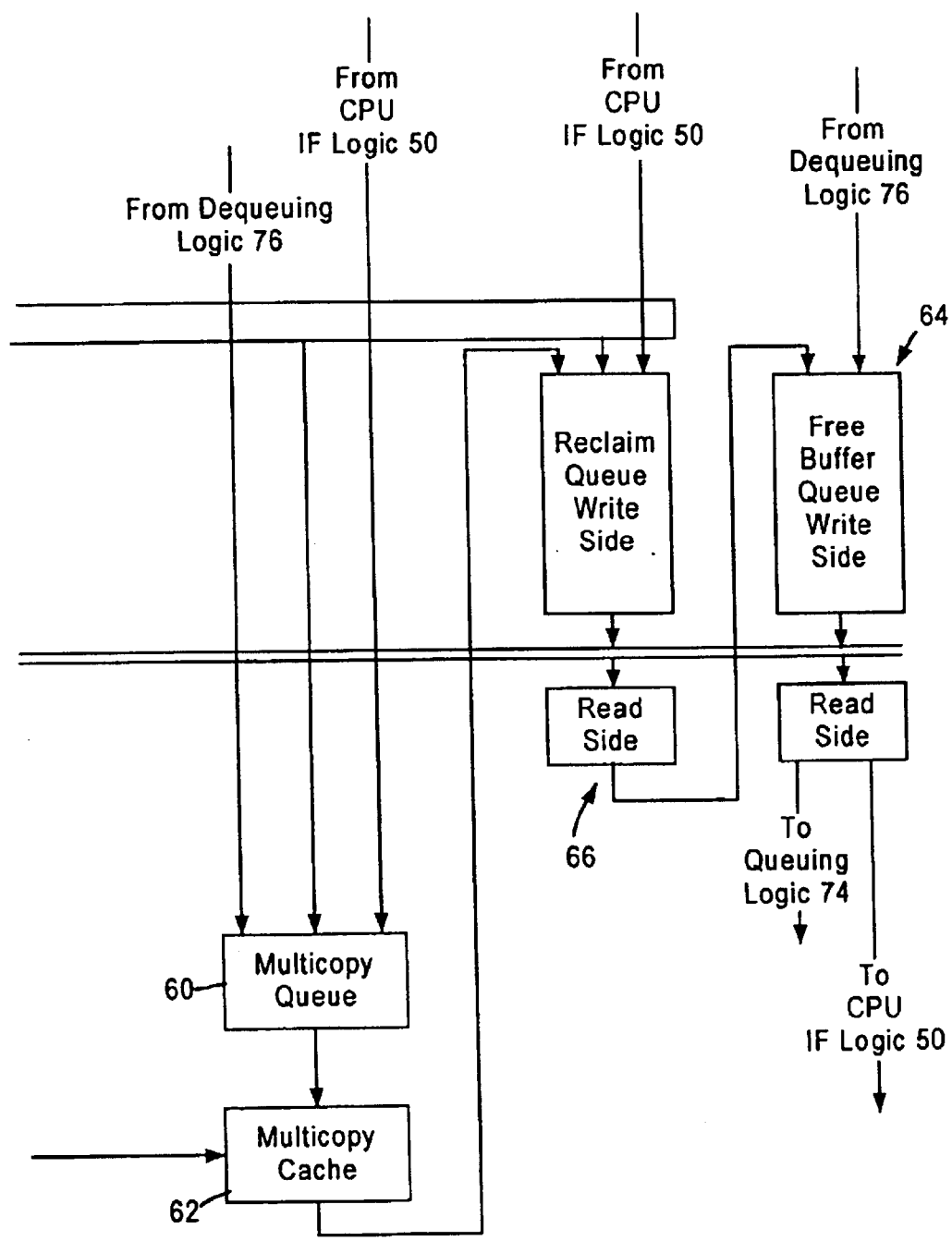

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3 z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the frame header information to determine which MAC ports will output the data frame stored at the location specified by the frame pointer.

Figure 4:
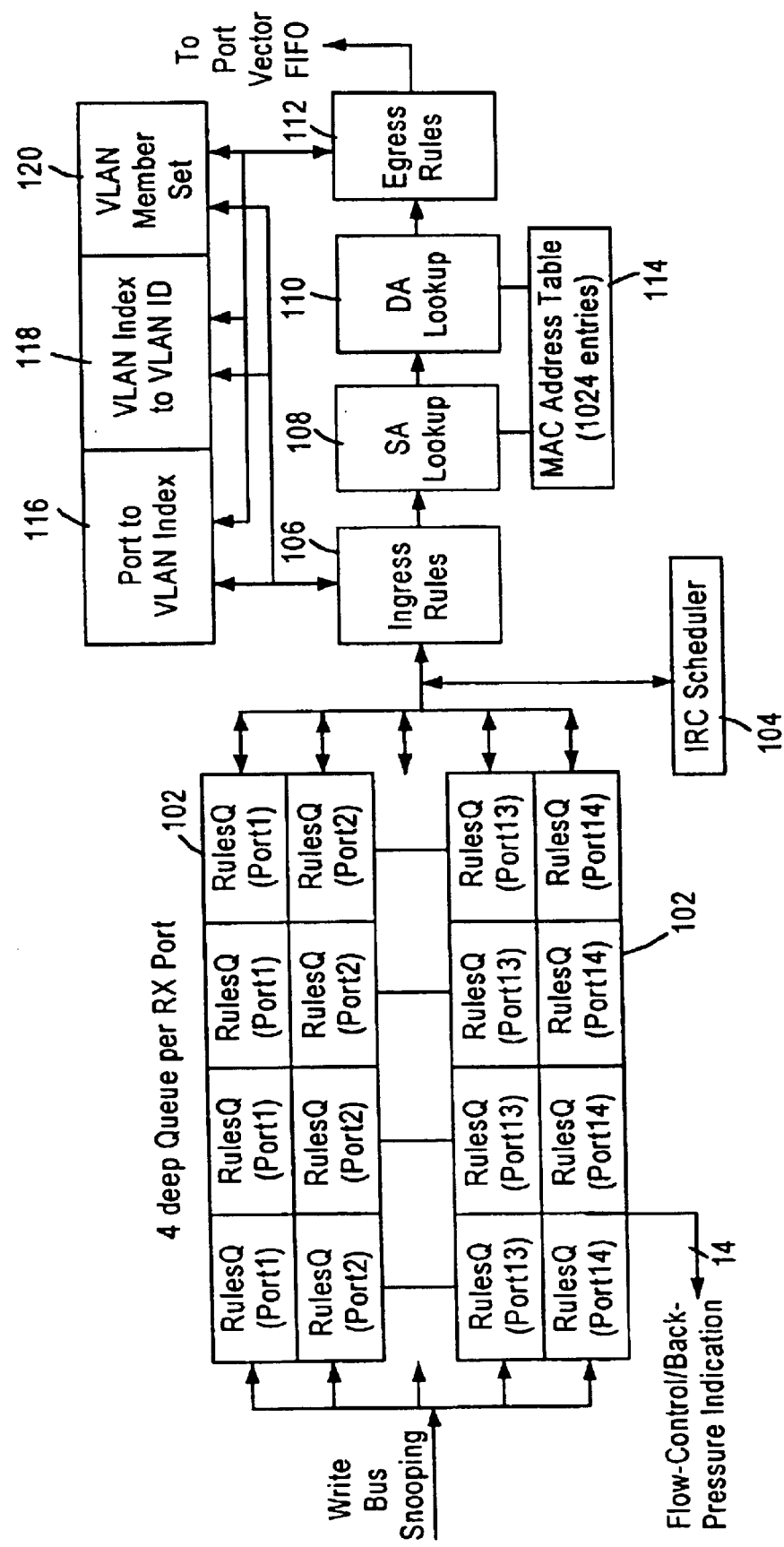
FIG. 4 is a block diagram of an internal rules checker (IRC) of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. In each rules queue 102, frame headers may be stored in a static random access memory (SRAM) having four 40-byte entries, and frame pointers may be stored in a SRAM having four 13-bit entries.

Frame headers and frame pointers from the rules queues 102 are transferred to IRC logic circuitry including an ingress rules logic circuit 106, a source address (SA) lookup logic circuit 108, a destination address (DA) lookup logic circuit 110 and an egress rules logic circuit 112. The IRC scheduler 104 provides time slots for sequentially transferring data held in the rules queues 102 to the IRC logic circuitry. The SA lookup logic circuit 108 and the DA lookup logic circuit 110 are connected to IRC address table logic 114 that contains an SRAM for storing the IRC address table. Prior to searching the address table, the ingress logic circuit 106 applies ingress rules to the received frame header. After the SA and DA lookup logic circuits 108 and 110 has searched the address table for SA and DA information, the egress rules logic circuit 112 applies egress rules to the port vector retrieved from the address table.

The IRC logic circuits 106, 108, 110 and 112 are connected in a pipeline that processes the frame header information of every received frame to produce a forwarding descriptor supplied to the port vector FIFO 56. In particular, the ingress rules logic circuit 106 detects whether a frame was received with an error. Also, as will be discussed in more detail later, the ingress rules logic circuit may check VLAN information of a frame to prevent the IMS 12 from forwarding a frame that does not belong to a VLAN associated with the port receiving that frame. If an error is detected or the frame's VLAN information does not match with allocated VLAN data, the ingress rules logic 106 produces a forwarding descriptor with a null port vector. This forwarding descriptor is transferred directly to the port vector FIFO 56 without performing SA and DA lookup operations and egress rules operations.

The SA lookup logic circuit 108 searches the IRC address table 114 for entries associated with the MAC source addresses for the corresponding frame. For instance, the SA lookup logic circuit 108 checks whether the SA and VLAN information stored in the IRC address table 114 for a given receive port matches the SA and VLAN information obtained from the received frame. If an unknown source address is obtained from a frame received by a particular switch port, the SA lookup logic circuit may learn such address and add a new address entry to the IRC address table 114.

The DA lookup logic circuit 110 searches the DA and VLAN information in the IRC address table 114 to make a frame forwarding decision. In particular, the DA lookup logic circuit 110 checks whether the DA and VLAN information stored in the IRC address table 114 for a given transmit port matches the DA and VLAN information obtained from the received frame.

The egress rules logic circuit 112 performs egress rules operations to check each transmit port in the port vector list produced by the DA lookup logic circuit 110 to remove or mask disabled ports, and the port from which the frame is received. Also, the egress logic circuit 112 may check the frame's VLAN information to prevent transmission from a port that does not support the VLAN associated with the frame. As a result, the egress logic circuit 112 generates a forwarding descriptor including a port vector identifying each port that should transmit the corresponding frame.

Thus, the IRC 40 checks VLAN information of a frame to determine whether the frame belongs to a VLAN associated with a particular receive or transmit port. In accordance with the present invention, each receive or transmit port of the IMS 12 supports multiple VLANs.

Figure 5:
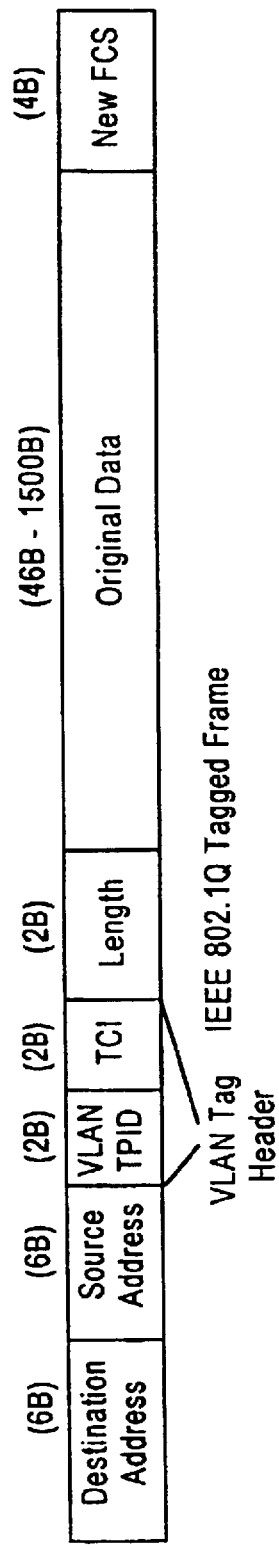
FIG. 5 is a diagram illustrating the format of a VLAN-tagged frame.
Figure 6:
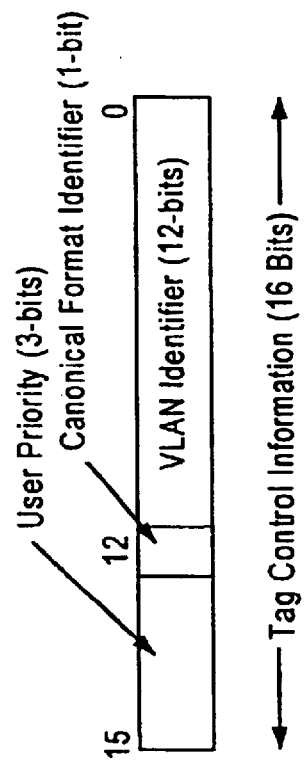
FIG. 6 is a diagram illustrating the format of a VLAN tag header.

To communicate VLAN membership information to a network switch, a VLAN tag header may be inserted into a frame. As shown in FIG. 5, in accordance with the IEEE 802.1Q standard, a VLAN tag header is added to DA, SA, length, data and frame check sequence (FCS) fields. The VLAN tag header consists of a 16-bit VLAN tag protocol identifier (TPID).field, and a 16-bit tag control information (TCI) field. As shown in FIG. 6, the TCI field consists of a 3-bit user priority field, a 1-bit canonical format indicator (CFI), and a 12-bit VLAN identifier (VLAN ID). To perform VLAN-related frame filtering during ingress rules and egress rules logic operations, the IRC 40 checks the VLAN ID, which uniquely identifies which VLAN a particular frame belongs to.

When VLAN ingress filtering is enabled for a particular port, the ingress rules logic circuit 107 performs VLAN ingress filtering of frames received via that port. For example, setting an ingress filtering bit in a port configuration register may enable the VLAN ingress filtering to prevent the IMS 12 from forwarding a frame that does not belong to one of the VLANs associated with the receiving port. However, if a frame has no VLAN tag header, or a VLAN tag header has a VLAN ID equal to 0, the IRC 40 does not perform ingress filtering.

Enabling VLAN ingress filtering for a-particular port may also enable VLAN egress checking for that port to prevent the port from transmitting a frame that does not belong to a VLAN associated with that port.

The IRC 40 holds VLAN tables to support the VLAN ingress filtering and VLAN egress checking. The VLAN tables includes a port to VLAN index table 116, a VLAN index to VLAN ID table 118 and a VLAN member set table 120. The VLAN table may be stored in SRAMs accessible to the ingress rules logic circuit 106, egress rules logic circuit 112, and the host CPU 32 via the host CPU interface 50. The tables 116, 118 and 120 may be maintained and updated by the host CPU 32.

As illustrated in FIG. 7, the port to VLAN index table 116 contains fifteen 6-bit entries corresponding to ports 1 to 14 and the management queue 68 (identified as port 0). Each 6-bit entry contains a VLAN index for the corresponding switch port or management queue 68. The port to VLAN index table 116 is used to assign to a frame a port-based VLAN if the frame is received without a VLAN tag header or with a VLAN tag header having a VLAN ID equal to 0.

As shown in FIG. 8, the VLAN index to VLAN ID table 118 contains 64 12-bit entries indicating VLAN IDs corresponding to VLAN indices 0 to 63. Thus, each VLAN index in the table 118 identifies a particular 12-bit VLAN ID. The VLAN index to VLAN ID table 118 is used for the VLAN ingress filtering and VLAN egress checking.

Referring to FIG. 9, the VLAN member set table 120 contains fifteen 64-bit entries corresponding to the management queue 68 (port 0) and ports 1 to 14. Each 64-bit entry represents a VLAN member set for a particular port. Each bit in the VLAN member set entry represents a VLAN index indicating the VLAN that may be supported by that port. For example, if bit n of the member set entry corresponding to port m is set to 1, port m is considered to be a member of the VLAN indicated by VLAN index n. Thus, each port of the IMS 12 may be a member of 64 different VLANs.

If the ingress filtering bit for a particular port is set, the ingress rules logic circuit 106 accesses the VLAN index to VLAN ID table 118 and the VLAN member set table 120 to perform VLAN ingress filtering of frames received via that port, for preventing the IMS 12 from forwarding a frame that does not belong to one of the VLANs associated with the port.

If the frame has no VLAN tag header or if it has a VLAN ID equal to 0, the ingress rules logic circuit 106 does not perform VLAN ingress filtering regardless of the state of the ingress filtering bit. Instead, the ingress rules logic circuit 106 accesses the port to VLAN index table 116 to assign to the frame a port-based VLAN that corresponds to the port on which the frame was received.

However, if the frame has a VLAN tag header with a non-zero VLAN ID, the ingress rules logic circuit 106 retrieves the VLAN index corresponding to the frame's VLAN ID from the VLAN index to VLAN ID table 118. If the frame's VLAN ID is not found in this table, the frame is forwarded only to the management queue 68.

Then, the ingress rules logic circuit 106 examines the entry associated with the receiving port in the VLAN member set table 120 to check the bit that corresponds to the retrieved VLAN index. If this bit is set to 1, the ingress rules logic circuit 106 passes the frame to the SA lookup logic circuit 108 for further processing. If this bit is 0, the ingress rules logic circuit 106 concludes that the frame does not belong to any one of the VLANs associated with the receiving port. As a result, the frame is discarded. The forwarding descriptor with the null port vector is passed directly to the port vector FIFO 56 without performing SA and DA lookups or egress rules operations.

As discussed above, enabling VLAN ingress filtering also enables VLAN egress checking performed by the egress rules logic circuit 112. If the ingress filtering bit for a particular port is set, the VLAN egress checking of a frame is performed to prevent the frame from being transmitted via that port if the frame does not belong to one of the VLANs associated with the port.

The egress rules logic circuit 112 accesses the VLAN member set table 120 to examine entries corresponding to transmit ports identified by the DA lookup logic circuit 110. In each of these entries, the egress rules logic circuit 112 checks the bit corresponding to the VLAN index of the frame. If this bit is set to 1, the egress rules logic circuit 112 retrieves the corresponding VLAN ID from the VLAN index to VLAN ID table 118 to construct a forwarding descriptor having the VLAN ID associated with the frame. The dequeuing logic will create a VLAN tag header with this VLAN ID.

If for a particular transmit port, the bit corresponding to the frame's VLAN index is 0, the egress rules logic circuit 112 concludes that the frame does not belong to any of the VLAN's associated with that port. Therefore, the egress rules logic circuit 112 does not include that port in the port vector of a forwarding descriptor constructed for the frame.

Thus, the present invention enables each port of the IMS 12 to support connections to members of multiple VLANs. The ingress rules logic circuit 106 may perform VLAN ingress filtering for particular port to prevent the IMS 12 from forwarding a received frame that does not belong to one of the multiple VLANs supported by the receiving port. Also, the egress rules logic circuit 112 may perform VLAN egress checking for a particular port to prevent that port from transmitting a frame that does not belong to one of the multiple VLANs supported by the port.

In this disclosure, there are shown and described only the preferred embodiments of the invention, but it is to be understood that the invention is capable of changes and modifications within the scope of the inventive concept as expressed herein.

What is claimed is:

1. A network switching system comprising:
   a first port for receiving data packets from members of a first plurality of virtual local area networks (VLANs),
   a second port for transmitting the data packets, the second port being configured for transmitting the data packets to a second plurality of VLANs, and
   a decision making engine responsive to the data packets received by the first port for controlling forwarding of the received data packets to the second port,
   the decision making engine including;
   a first logic circuit responsive to the received data packets to prevent the switching system from forwarding to the second port a received data packet that does not belong to the first plurality of VLANs, and
   a second logic circuit responsive to the received data packets to prevent the second port from transmitting a data packet that does not belong to the second plurality of VLANs.

2. The system of claim 1, wherein the decision making engine further comprises a first storage for storing a VLAN member set table having a first VLAN member set indicating information on the first plurality of VLANs supported by the first port.

3. The system of claim 2, wherein the first VLAN member set comprises VLAN indices pointing to VLAN identifiers corresponding to the first plurality of VLANs.

4. The system of claim 3, wherein the decision making engine further comprises a second storage for storing a VLAN index to VLAN identifier table indicating correlation between the VLAN indices and the VLAN identifiers.

5. The system of claim 2, wherein the first logic circuit is configured to access the VLAN member set table to check whether the received data packets belong to the first plurality of VLANs.

6. The system of claim 1, wherein the VLAN member set table has a second VLAN member set indicating information on the second plurality of VLANs supported by the second port.

7. A data communication system for switching data between multiple ports, comprising:
   an input logic circuit responsive to received data packets for discarding incoming data packets that do not belong to VLANs supported by receiving ports,
   an output logic circuit responsive to data packets passed through the input logic circuit for preventing the ports from transmitting data packets that do not belong to VLANs supported by transmitting ports, and
   a VLAN membership system coupled to the input and output logic circuits for enabling each of the multiple ports to support connections with multiple VLANs.

8. The system of claim 7, wherein the VLAN membership system comprises a VLAN member set storage for storing a VLAN member set table having multiple entries corresponding to each of the multiple ports.

9. The system of claim 8, wherein an entry in the VLAN member set table contains VLAN indices identifying the multiple VLANs supported by the corresponding port.

10. The system of claim 9, wherein the VLAN membership system further comprises a VLAN index storage for storing a VLAN index to VLAN identifier table indicating correlation between the VLAN indices and VLAN identifiers of the received data packets.

11. In a network switch having a plurality of ports, a method of enabling each port of the plurality of the ports of the switch to support connections with multiple VLANs, comprising the steps of:

storing VLAN data indicating a plurality of VLAN identifiers corresponding to the multiple VLANs to be supported by each port of the plurality of the ports, determining a first VLAN identifier of a first data packet received via a port of the plurality of the ports, comparing the first VLAN identifier with the plurality of VLAN identifiers determined using the stored VLAN data, forwarding the first data packet for further processing if the first VLAN identifier matches one of the plurality of VLAN identifiers, discarding the first data packet if the first VLAN identifier does not match one of the plurality of VLAN identifiers, determining VLAN information corresponding to a second VLAN identifier of a second data packet to be transmitted from the port, and comparing the VLAN information with the stored VLAN data to determine whether the second VLAN identifier matches one of the plurality of VLAN identifiers.

12. The method of claim 11, further comprising the step of preventing the second data packet from being transmitted from the port if the second VLAN identifier does not match one of the plurality of VLAN identifiers.

13. The method of claim 12, further comprising the step of transmitting the second data packet from the port if the second VLAN identifier matches one of the plurality of VLAN identifiers.

* * * * *